United States Patent Office 2,894,800
Patented July 14, 1959

2,894,800
DYESTUFF MIXTURES

Jacques Guenthard, Basel, and Albin Peter, Binningen, Switzerland, assignors, by mesne assignments, to Saul & Co., Newark, N.J., as nominee of Fidelity Union Trust Company, executive trustee under Sandoz Trust No Drawing. Application December 3, 1954
Serial No. 473,036

Claims priority, application Switzerland January 26, 1954

6 Claims. (Cl. 8—25)

This invention relates to new dyestuff mixtures of the 1-hydroxy-4-phenylaminoanthraquinone series.

Dyestuffs of the 1-hydroxy-4-phenylamino-anthraquinone series usually possess only little affinity for cellulose acetate. The drawing capacity onto cellulose acetate of these dyestuffs is tested by dyeing said fibers with the aid of dyestuff pastes which all are prepared in the same way. The amount of the dyestuff which remains after the dyeing process in the aqueous bath, is isolated by evaporating the water. The dry residue is dissolved in a suitable organic solvent. The solution thus obtained is compared with a solution containing the quantity of the dyestuff which originally has been used for the dyeing process. The comparison is carried out by a colorimetric test. The difference between the two values corresponds to the amount of the dyestuff which has drawn onto cellulose acetate.

In this way the following affinity values are obtained for 1-hydroxy-4-phenylaminoanthraquinone corresponding to the formula

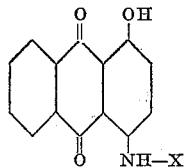

(A)

wherein X stands for a mononuclear aromatic radical of the benzene series.

FIRST TABLE

| Dyestuff No. | Symbol —NH—X stands for the radical of— | Amount of the dyestuff having drawn onto the fiber in percent |
|---|---|---|
| I | aminobenzene | 50 |
| II | 1-amino-2-methylbenzene | 10 |
| III | 1-amino-3-methylbenzene | 27.5 |
| IV | 1-amino-2-methoxybenzene | 22.5 |
| V | 1-amino-4-methoxybenzene | 2.5 |
| VI | 1-amino-4-hydroxybenzene | 40 |
| VII | 1,4-diaminobenzene | 40 |
| VIII | 1-amino-3-chlorobenzene | 30 |
| IX | 1-amino-4-hydroxyethylbenzene | 70 |
| X | 1-amino-2,3-dimethylbenzene | 5 |
| XI | 1-amino-3,4-dimethylbenzene | 5 |
| XII | 1-amino-4-phenylaminobenzene | 35 |
| XIII | 1-amino-4-formylaminobenzene | 40 |
| XIV | 1-amino-4-acetylaminobenzene | 27.5 |
| XV | 1-amino-4-chloroacetylaminobenzene | 30 |
| XVI | 1-amino-4-(N-methyl-N-acetyl)-aminobenzene | 37.5 |
| XVII | 1-amino-4-carboethoxyaminobenzene | 17.5 |
| XVIII | 1-amino-4-(ethoxy)-acetylaminobenzene | 50 |
| XIX | 1-amino-4-(butoxy)-acetylaminobenzene | 32.5 |
| XX | 1-amino-4-carbomethoxyaminobenzene | 55 |

It has now been found that the affinity for the cellulose acetate fiber of the dyestuffs of the 1-hydroxy-4-phenylaminoanthraquinone series can be enhanced when the dyestuffs are used in the form of mixtures which consist for at least ⅓ by weight of one or more compounds corresponding to the formula

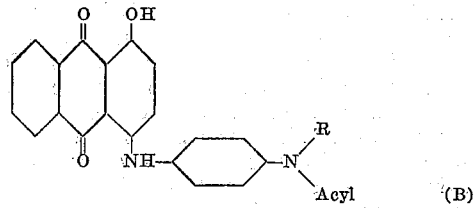

(B)

wherein R stands for hydrogen or methyl, and Acyl stands for the radical —COO.CH$_3$, —COO.C$_2$H$_5$, —CO.H or —CO.CH$_2$Y, Y being chosen from hydrogen and chlorine atoms and lower alkoxy groups.

The present invention is therefore more particularly concerned with the embodiment of mixtures of dyestuffs of the 1-hydroxy-4-phenylaminoanthraquinone series, which are characterized by a content, of at least ⅓ by weight of one or more compounds corresponding to the Formula B.

The following Second Table shows the drawing capacity onto cellulose acetate of new dyestuff mixtures prepared, according to the present invention, by admixing one or more dyestuffs corresponding to the Formula A with one or more dyestuffs corresponding to the Formula B. The drawing capacity is tested according to the process given in the opening paragraph. The respective percent figures are percent by weight. It can easily be seen from the table that the new dyestuff mixtures possess a drawing capacity onto cellulose acetate which is in an unexpected way enhanced with regard to that of the components serving for the preparation of said mixtures.

SECOND TABLE

| Dyestuff mixture No. | Dyestuff No. | Drawing amount in percent | |
|---|---|---|---|
| | | calculated | found |
| 1 | I (50%)+XV (50%) | 40 | 65 |
| 2 | I (50%)+XIV (50%) | 39 | 60 |
| 3 | I (50%)+XVI (50%) | 44 | 70 |
| 4 | III (50%)+XIV (50%) | 27.5 | 40 |
| 5 | III (50%)+XVI (50%) | 32.5 | 50 |
| 6 | IV (50%)+XVI (50%) | 30 | 50 |
| 7 | V (50%)+XVI (50%) | 20 | 40 |
| 8 | V (50%)+XIV (50%) | 15 | 25 |
| 9 | I (33%)+III (33%)+XIV (34%) | 35 | 50 |
| 10 | I (25%)+III (25%)+XIV (50%) | 33 | 45 |
| 11 | III (25%)+IV (25%)+XIV (25%)+XV (25%) | 27 | 40 |
| 12 | I (33%)+XIV (67%) | 35 | 52.5 |
| 13 | I (67%)+XIV (33%) | 42.5 | 47.5 |
| 14 | II (25%)+XIII (75%) | 32.5 | 40 |
| 15 | II (20%)+XIII (80%) | 34 | 45 |
| 16 | II (50%)+XIII (50%) | 25 | 35 |
| 17 | VIII (50%)+XVII (50%) | 24 | 37.5 |
| 18 | VI (50%)+XVII (50%) | 29 | 35 |
| 19 | XII (50%)+XIV (50%) | 31 | 40 |
| 20 | X (20%)+XVII (80%) | 15 | 35 |
| 21 | XI (50%)+XIV (50%) | 16 | 25 |
| 22 | IX (50%)+XVII (50%) | 44 | 50 |
| 23 | I (33%)+XIV (33%)+XVII (34%) | 32 | 55 |
| 24 | I (50%)+XVIII (50%) | 50 | 62.5 |
| 25 | II (50%)+XIX (50%) | 21 | 45 |
| 26 | I (50%)+XX (50%) | 52.5 | 67.5 |
| 27 | VII (50%)+XIII (50%) | 40 | 45 |
| 28 | XIV (50%)+XV (50%) | 29 | 40 |
| 29 | XIV (50%)+XVI (50%) | 32.5 | 55 |

As the "calculated" drawing amount in percent there is to be understood the arithmetical mean of the drawing amount of the components.

Example:
  50 parts of dyestuff No. I with a drawing capacity of 50 percent, and
  50 parts of dyestuff No. XV with a drawing capacity of 30 percent give 100 parts of the dyestuff mixture No. 1 which has a "calculated" drawing capacity of 40 percent. However, the colorimetric test shows for dyestuff mixture No. 1 a drawing capacity of 65 percent ("found" drawing amount).

The affinity values which are given in the preceding second table, are the more astonishing as mixtures prepared from 1-hydroxy-4-phenylaminoanthraquinone which do not contain compounds of the Formula B, possess a drawing capacity onto cellulose acetate which is the same as calculated from that of the components. The following Third Table proves that by admixing of two or more dyestuffs of the 1-hydroxy-4-phenylaminoanthraquinone series which are free from compounds of the Formula B, dyestuff mixtures are obtained the affinity of which for cellulose actate is the arithmetical mean of that of the components.

THIRD TABLE

| Dyestuff mixture | Dyestuff No. | Drawing amount in percent | |
|---|---|---|---|
| | | calculated | found |
| a | I (50%)+III (50%) | 39 | 40 |
| b | I (50%)+IX (50%) | 60 | 60 |
| c | I (50%)+VII (50%) | 45 | 45 |
| d | I (50%)+VI (50%) | 45 | 45 |
| e | IV (50%)+VIII (50%) | 26 | 25 |
| f | IV (33%)+VI (33%)+XII (34%) | 32.5 | 35 |
| g | I (25%)+IV (25%)+VI (25%)+XII (25%) | 37 | 35 |

Also here the "calculated" drawing amount in percent is to be understood as the arithmetical mean of the drawing amount of the components.

Example:
   50 parts of dyestuff No. I with a drawing capacity 50 percent, and
   50 parts of dyestuff No. III with a drawing capacity of 27.5 percent give 100 parts of the dyestuff mixture (a) which has a "calculated" drawing capacity of 39 percent. The colorimetric test yields a very similar figure, i.e. a drawing capacity of 40 percent ("found" drawing amount).

Recapitulating it can be stated that dyestuff mixtures of compounds of the Formula A which consist for at least ⅓ of a compound corresponding to the Formula B, possess a better drawing capacity for cellulose acetate than the components have. On the contrary, dyestuff mixtures of compounds of the Formula A which are free from a compound of the Formula B, possess a drawing capacity which is the arithmetical mean of the drawing capacity of the components.

For practical use in the technique of dyeing the dyestuff mixtures are dispersed in a usual way and are admixed with protecting colloids, dispersing and/or wetting agents. The dyestuff preparations are used in moist form, as pastes, or in dry form, for instance as powders obtained by drying the pastes in an atomizing dryer. The new dyestuff mixtures can be used not only for dyeing cellulose acetate and other acylated celluloses, but also for the dyeing of other artificial fibers and plastic masses, for example synthetic polyamide fibers (nylon, Perlon), and polyester fibers (Dacron, Terylene).

The following examples illustrate the process of preparation of the new dyestuff mixtures and the process of dyeing cellulose acetate therewith. For that purpose the the dyestuff mixtures Nos. 2 and 6 have been chosen. The parts denote parts by weight, the percentages are percentages by weight, and the temperatures are given in degrees centigrade.

*Example 1*

One part of 1-hydroxy-4-phenylaminoanthraquinone and 1 part of 1-hydroxy-4-(4'-acetylamino)-phenylamino- anthraquinone are dissolved in 15 parts of concentrated sulfuric acid. The solution thus obtained is poured into 100 parts of water. The dyestuff mixture which has precipitated, is filtered off and washed until neutral reaction. After the addition of 2 parts of the technical condensation product of naphthalene sulfonic acid and formaldehyde the moist filter cake is brought, in a mill with stainless steel balls, into a colloidal form. The paste is dried in an atomizing dryer. A grayish violet powder is obtained which can easily be dispersed in water. The dyestuff draws onto cellulose acetate at 80° for 60%, and completely onto Dacron at 97°.

*Example 2*

One part of 1-hydroxy-4-(2'-methoxy)-phenylaminoanthraquinone and 1 part of 1-hydroxy-4-(4'-N-methyl-N-acetylamino)-phenylaminoanthraquinone are added at 20° to a solution of 1 part of boric acid in 20 parts of 85% sulfuric acid. The mass is stirred until complete dissolution and is then poured into 200 parts of water at 80°. The precipitated dyestuff mixture is filtered off at 60° and is washed until neutral reaction. It is then worked up according to the process given in the preceding example. When dyed onto cellulose acetate, the dyebath is exhausted to 50%.

*Example 3*

2 parts of the dyestuff mixture No. 2 obtained according to Example 1 are made into a paste with 40 parts of a 10% aqueous Turkey red oil solution. The paste is diluted with 50 parts of water of at most 60°.

The dispersion of the dyestuff mixture is poured into a solution of 3 parts of a fatty alcohol sulfonate in 3000 parts of water. Then 100 parts of cellulose acetate fabric are entered into the dyebath. The temperature of the bath is raised within 60 minutes to 80° and is held for a further 60 minutes at 80°.

The dyebath is exhausted to 60%, and the dyeing process is ended. The cellulose acetate fabric is withdrawn from the bath, is rinsed with water and dried at a moderate temperature.

If instead of cellulose acetate fabric a mixed fabric of cellulose acetate and nylon, or of cellulose acetate and spun rayon, or of cellulose acetate and viscose rayon, is dyed in the dyebath of this example, the dyeing temperature can be raised to 95°. The exhaustion of the dyebath is then more than 60%.

*Example 4*

One part of the dyestuff mixture No. 6 obtained according to the data of Example 2 is dispersed in 100 parts of a 1% aqueous soap solution. 5 parts of the thus obtained dyestuff dispersion are added with good stirring to 250 parts of a 0.1% aqueous solution of Marseilles soap and, at 30°, 2.5 parts of cellulose acetate skein are entered into the thus prepared dyebath. The temperature of the bath is raised within 30 minutes to 80° and the cellulose acetate skein is stirred therein for 60–75 minutes at 80°.

The dyebath is thereupon exhausted at 50%. The skein is withdrawn, is rinsed with water and is dried.

Having thus disclosed the invention, what is claimed is:

1. As a composition of matter a dyestuff mixture of 1-hydroxy-4-phenylaminoanthraquinone dyestuffs which correspond to the formula

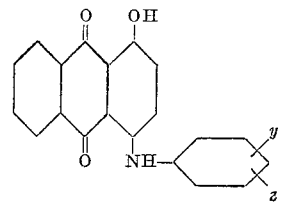

wherein each of $y$ and $z$ stands for a member selected from the group consisting of hydrogen, chlorine, methyl, hydroxyethyl, hydroxy, methoxy, amino and phenylamino, said mixture containing at least ⅓ by weight of 1-hydroxy-4-phenylaminoanthraquinone dyestuff corresponding to the formula

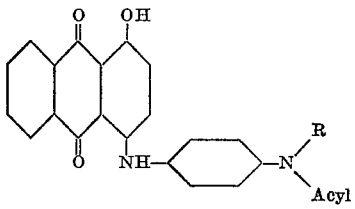

wherein R stands for a member selected from the group consisting of hydrogen and methyl, and Acyl stands for a member selected from the group consisting of the radical —COO.CH$_3$, —COO.C$_2$H$_5$, —CO.H and CO.CH$_2$Y, Y being chosen from the group consisting of hydrogen, chlorine and lower alkoxy.

2. As a composition of matter the dyestuff mixture consisting of 50 percent by weight of 1-hydroxy-4-phenylaminoanthraquinone and 50 percent by weight of 1-hydroxy-4-(4'-acetylamino)-phenylaminoanthraquinone.

3. As a composition of matter the dyestuff mixture consisting of 50 percent by weight of 1-hydroxy-4-phenylaminoanthraquinone and 50 percent by weight of 1-hydroxy - 4 - (4' - N - methyl - N - acetylamino) - phenylaminoanthraquinone.

4. As a composition of matter the dyestuff mixture consisting of 20 percent by weight of 1-hydroxy-4-(2'-methyl)-phenylaminoanthraquinone and 80 percent by weight of 1-hydroxy-4-(4'-formylamino)-phenylaminoanthraquinone.

5. As a composition of matter the dyestuff mixture consisting of 33 percent by weight of 1-hydroxy-4-phenylaminoanthraquinone, 33 percent by weight of 1-hydroxy-4-(4'-methyl)-phenylaminoanthraquinone and 34 percent by weight of 1-hydroxy-4-(4'-acetylamino)-phenylaminoanthraquinone.

6. As a composition of matter the dyestuff mixture consisting of 25 percent by weight of 1-hydroxy-4-(3'-methyl)-phenylaminoanthraquinone, 25 percent by weight of 1-hydroxy-4-(2'-methoxy)-phenylaminoanthraquinone, 25 percent by weight of 1-hydroxy-4-(4'-acetylamino)-phenylaminoanthraquinone and 25 percent by weight of 1 - hydroxy - 4 - (4' - chloroacetylamino) - phenylaminoanthraquinone.

References Cited in the file of this patent

UNITED STATES PATENTS

| | | |
|---|---|---|
| 1,967,772 | Grossmann | July 24, 1934 |
| 2,053,275 | Ellis | Sept. 8, 1936 |
| 2,060,186 | Felix | Nov. 10, 1936 |
| 2,442,191 | Grossmann | Feb. 22, 1944 |
| 2,506,020 | Grossmann | May 2, 1950 |

FOREIGN PATENTS

| | | |
|---|---|---|
| 848,792 | Germany | Sept. 8, 1952 |

OTHER REFERENCES

Am. Dyestuff Reporter for Jan. 11, 1937, pp. 3 and 4.